(12) United States Patent
Urata et al.

(10) Patent No.: US 7,606,129 B2
(45) Date of Patent: Oct. 20, 2009

(54) DISK CONTROLLING APPARATUS AND COMPUTER PRODUCT

(75) Inventors: Yukio Urata, Kawasaki (JP); Masaki Makifuchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 392 days.

(21) Appl. No.: 11/088,279

(22) Filed: Mar. 23, 2005

(65) Prior Publication Data

US 2006/0140068 A1  Jun. 29, 2006

(30) Foreign Application Priority Data

Nov. 12, 2004  (JP)  ............................. 2004-329267

(51) Int. Cl.
  *G11B 5/09*  (2006.01)
(52) U.S. Cl. .................... 369/53.2; 369/47.1; 360/48
(58) Field of Classification Search ............. 369/30.01, 369/47.1, 44.27, 47, 25, 25.01
See application file for complete search history.

(56) References Cited

U.S. PATENT DOCUMENTS

| 4,773,004 | A | * | 9/1988 | Gershenson et al. ........ 711/113 |
| 4,922,241 | A | * | 5/1990 | Inoue et al. .................... 345/98 |
| 5,127,088 | A | * | 6/1992 | Takaki ........................ 711/112 |
| 5,621,668 | A | * | 4/1997 | Nakata ........................ 702/176 |
| 5,652,857 | A | | 7/1997 | Shimoi et al. |
| 6,404,707 | B1 | * | 6/2002 | Kaneda et al. ........... 369/30.06 |
| 6,914,738 | B2 | * | 7/2005 | Fujiwara et al. ................ 360/68 |
| 2003/0210627 | A1 | * | 11/2003 | Ijtsma et al. .............. 369/53.18 |
| 2003/0214743 | A1 | * | 11/2003 | Urata .......................... 360/53 |
| 2004/0125725 | A1 | * | 7/2004 | Kamioka et al. ......... 369/53.34 |

FOREIGN PATENT DOCUMENTS

| JP | HE13-192440 | 8/1991 |
| JP | HE18-249159 | 9/1996 |
| JP | 2003-330629 | 11/2003 |
| JP | 2004-14090 | 1/2004 |

* cited by examiner

*Primary Examiner*—Muhammad N. Edun
(74) *Attorney, Agent, or Firm*—Greer, Burns & Crain, Ltd.

(57) ABSTRACT

A disk apparatus writes and rewrites data in a storage disk and reads data from the storage disk. A disk controlling apparatus that controls the disk apparatus includes an environment information creating unit creates environment information that is related to an environment of the disk apparatus, a storing unit that appends the environment information to the data that is to be written to the storage disk, and a rewrite process determining unit determines whether to execute a rewrite process based on the environment information in the data read from the storage disk.

15 Claims, 10 Drawing Sheets

DISK CONTROLLING APPARATUS AND COMPUTER PRODUCT

BACKGROUND OF THE INVENTION

1) Field of the Invention

The present invention relates to a disk controlling apparatus and a computer product that can rewrite data that needs to be rewritten, on a priority basis.

2) Description of the Related Art

Conventionally, when a magnetic disk apparatus obtains data from a host computer or the like, the apparatus appends information such as a cyclic redundancy check (CRC) and an error correcting code (ECC) to the obtained data, and then writes the data to a magnetic disk.

However, changes occur as time passes, such as changes in the direction of the magnetization of the magnetic substance with which the magnetic disk is coated. Therefore, the magnetic disk apparatus becomes unable to read properly, the data that was written to the disk a predetermined time earlier.

Accordingly, to prevent the data written to the magnetic disk from becoming unreadable, magnetic disk apparatuses currently being used reread and rewrite the data periodically.

Japanese Patent Application Laid-open No. 2004-14090 discloses a technique that enables data written on a magnetic disk to be read efficiently, by changing the parameters of the data-reading circuit based on changes in the temperature of the magnetic disk apparatus.

However, this conventional technique has a drawback that it cannot rewrite data efficiently.

When the temperature of the magnetic disk apparatus is low, data written to the magnetic disk and data written at positions deviating from the track center suddenly become more difficult to read. Yet, these data are sequentially rewritten without distinguishing them from other data stored on the magnetic disk.

Therefore, it is important to promptly rewrite data that needs to be rewritten on a priority basis, rather than sequentially rewriting the data written on the magnetic disk.

SUMMARY OF THE INVENTION

It is an object of the present invention to at least solve the problems in the conventional technology.

According to an aspect of the present invention, a disk controlling apparatus that controls a disk apparatus includes a storage disk into which the disk apparatus writes and rewrites data and from which the disk apparatus reads data; an environment information creating unit that creates environment information that is related to an environment of the disk apparatus; a storing unit that appends the environment information created to data that is to be written to the storage disk; and a rewrite process determining unit that determines whether to execute a rewrite process for rewriting data in the storage disk based on the environment information in the data read from the storage disk.

According to another aspect of the present invention, a method of controlling a disk apparatus that writes and rewrites data into a storage disk and reads data from the storage disk includes creating environment information that is related to an environment of the disk apparatus; appending the environment information created to the data that is to be written to the storage disk; and determining whether to execute a rewrite process based on the environment information in the data read from the storage disk.

According to still another aspect of the present invention, a computer-readable recording medium stores therein a computer program that implements the above method on a computer.

The other objects, features, and advantages of the present invention are specifically set forth in or will become apparent from the following detailed description of the invention when read in conjunction with the accompanying drawings.

DETAILED DESCRIPTION

Exemplary embodiments of the present invention will be explained in detail below with reference to the accompanying drawings.

A concept of a hard disk controller according to an embodiment of the invention will be explained first. When a byte of data received from a host (hereinafter, "host data") is converted to a symbol, wasteful data is generated. The hard disk controller according to this embodiment allocates the wasteful data as apparatus environment data, and writes the apparatus environment data to a magnetic disk together with the host data. When there is a read verify or the like, the hard disk controller determines whether to rewrite based on the apparatus environment data contained in data read from the magnetic disk.

The apparatus environment data contains information relating to the temperature in the magnetic disk apparatus, information indicating whether data is written to a head sector of the magnetic disk, information relating to an offset amount of the data to be written to the magnetic disk, and information indicating the number of operating years of the magnetic disk apparatus, at the time of writing the data to the magnetic disk. In this embodiment, one byte is eight bits and one symbol is ten bits.

Figure 1:
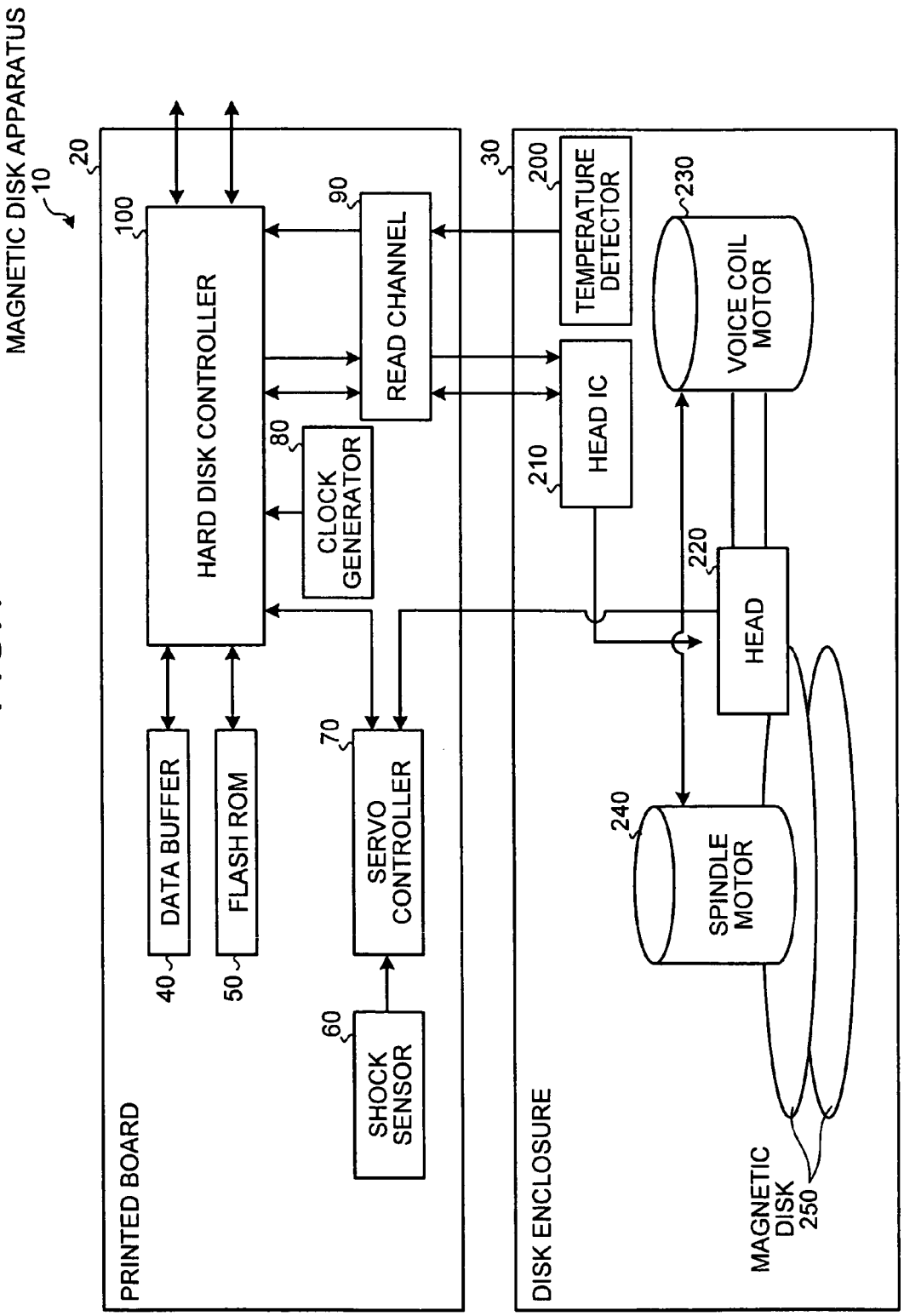
FIG. 1 is a functional block diagram of a magnetic disk apparatus according to the present invention.

A configuration of a magnetic disk apparatus according to this embodiment will be explained with reference to a functional block diagram shown in FIG. 1. A magnetic disk apparatus 10 includes a printed board 20 and a disk enclosure 30.

The printed board 20 includes a data buffer 40, a flash read-only memory (ROM) 50, a shock sensor 60, a servo controller 70, a clock generator 80, a read channel 90, and a hard disk controller 100. The disk enclosure 30 includes a temperature detector 200, a head integrated circuit (IC) 210, a head 220, a voice coil motor 230, a spindle motor 240, and a magnetic disk 250.

The data buffer 40 momentarily stores data from a host (not shown). The flash ROM 50 stores data such as programs used by the hard disk controller 100.

The shock sensor 60 detects horizontal and vertical vibrations of the magnetic disk apparatus 10, and reports vibration information (information relating to the detected vibrations) to the servo controller 70. The servo controller 70 controls the voice coil motor 230 and the spindle motor 240, based on the vibration information, commands from the magnetic disk apparatus 10, and the like.

The clock generator 80 generates a clock, and supplies it to the hard disk controller 100. The read channel 90 is accessed by the hard disk controller 100 and the IC 210, for exchanging data. The temperature detector 200 sends temperature inside the disk enclosure 30 as temperature information, to the read channel 90, which in turn sends the temperature information to the hard disk controller 100.

The hard disk controller 100 controls the entire magnetic disk apparatus 10. The hard disk controller 100 also creates apparatus environment data based on the temperature information from the read channel 90, information indicating whether data is written to a head sector of the magnetic disk 250 (hereinafter, "head sector information"), information relating to the offset amount of the data to be written to the magnetic disk 250 (hereinafter, "offset amount information"), and information indicating the number of operating years of the magnetic disk apparatus 10 (hereinafter, "operating years information").

The hard disk controller 100 sets a wasteful data region, which occurs when a unit of the host data is converted to a symbol, as apparatus environment data, and writes it to the magnetic disk 250. When a read verify is performed, the hard disk controller 100 determines whether to rewrite based on the apparatus environment data that is set, and rewrites only when it is determined that rewrite operation is to be performed.

The temperature detector 200 detects the temperature inside the disk enclosure 30, and passes the detected temperature as temperature information to the read channel 90. The IC 210 passes data from the read channel 90 to the head 220, and passes data read by the head 220 to the read channel 90.

The head 220 writes data to the magnetic disk 250, and reads/deletes written data. The voice coil motor 230 moves the head 220 to an appropriate position on the magnetic disk 250 based on a command from the servo controller 70.

The spindle motor 240 rotates the magnetic disk 250 at an appropriate rotation speed based on a command from the servo controller 70. The magnetic disk 250 is a recording medium, and is coated with a magnetic substance. Data is stored on the magnetic disk by electrically changing the magnetization status of a magnetic substance.

Data processing executed by the hard disk controller 100 shown in FIG. 1 will be explained next, with reference to FIG. 2.

The hard disk controller 100 includes a synchronous dynamic random access memory (SDRAM) 110, a byte/symbol converter 120, a data first in first out (DFIFO) 130, an error correcting code (ECC) generator 140, and a latency shifter 150.

The SDRAM 110 momentarily stores host data received from a host (not shown), and then passes the host data to the byte/symbol converter 120. The byte/symbol converter 120 converts units of the host data from bytes to symbols.

Specifically, to convert a total of 516 bytes including 512 bytes of host data and 4 bytes of cyclic redundancy check (CRC) data, the byte/symbol converter 120 performs a 16/20 conversion (516×16÷20=412.8), producing 412.8 symbols. The byte/symbol converter 120 then passes the converted data (hereinafter, "symbol data") to the DFIFO 130.

The DFIFO 130 temporarily stores the symbol data received from the byte/symbol converter 120, and passes the symbol data, in FIFO sequence, to the ECC generator 140 and the latency shifter 150.

Conventionally, upon receiving symbol data of 412.8 symbols, the DFIFO 130 appends dummy data of 1.2 symbols to the symbol data, and passes it to the ECC generator 140 and the latency shifter 150 as a 414 symbols. However, in the present invention, apparatus environment data is appended to the symbol data instead of dummy data. This embodiment describes an example where 1.2 symbols (12bits) of apparatus environment data are appended to the symbol data. However, there are no restrictions on this number.

The ECC generator 140 generates an ECC based on symbol data obtained from the DFIFO 130, and passes it to an RLL 90*a* of the read channel 90. The latency shifter 150 delays symbol data obtained from the DFIFO 130, and passes it to the RLL 90*a* of the read channel 90. This embodiment describes an example where the ECC generator 140 generates 32 symbols of ECC data.

The RLL 90*a* periodically generates waves to prevent the data waveforms from becoming nearly linear. For example, the data waveform becomes linear when the same data (such as zero) continues, and hence, the RLL 90*a* corrects the linearity by periodically generating a waveform that expresses the data.

The RLL 90*a* includes a scrambler that randomizes the order of obtained data. The read channel 90 regenerates the original data from the randomized data.

The RLL 90*a* executes a 60/63 conversion of the total of 446 symbols of data (32 symbols of ECC data passed from the ECC generator 140 plus 414 symbols of data passed from the latency shifter 150).

Overall data processing by the hard disk controller 100 shown in FIG. 2 will be explained next. Host data from the host is temporarily stored in the SDRAM 110, and then passed to the byte/symbol converter 120, where units of the host data are converted from bytes to symbols. The converted data is passed to the DFIFO 130.

The DFIFO 130 appends apparatus environment data to the symbol data, and passes the data to the ECC generator 140 and the latency shifter 150. The ECC generator 140 generates an ECC based on the data obtained from the DFIFO 130, and passes the ECC generated, to the RLL 90*a*. The latency shifter 150 delays the data obtained from the DFIFO 130, and transmits the data to the RLL 90*a*.

Figure 2:
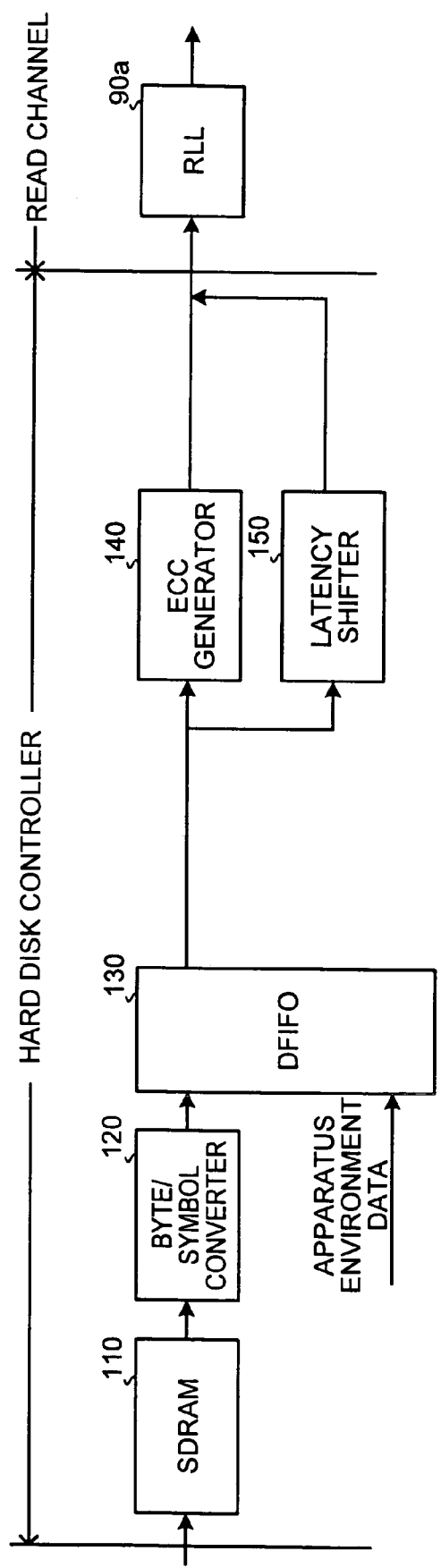
FIG. 2 is a diagram to explain data processing executed by a hard disk controller shown in FIG. 1.
Figure 3:
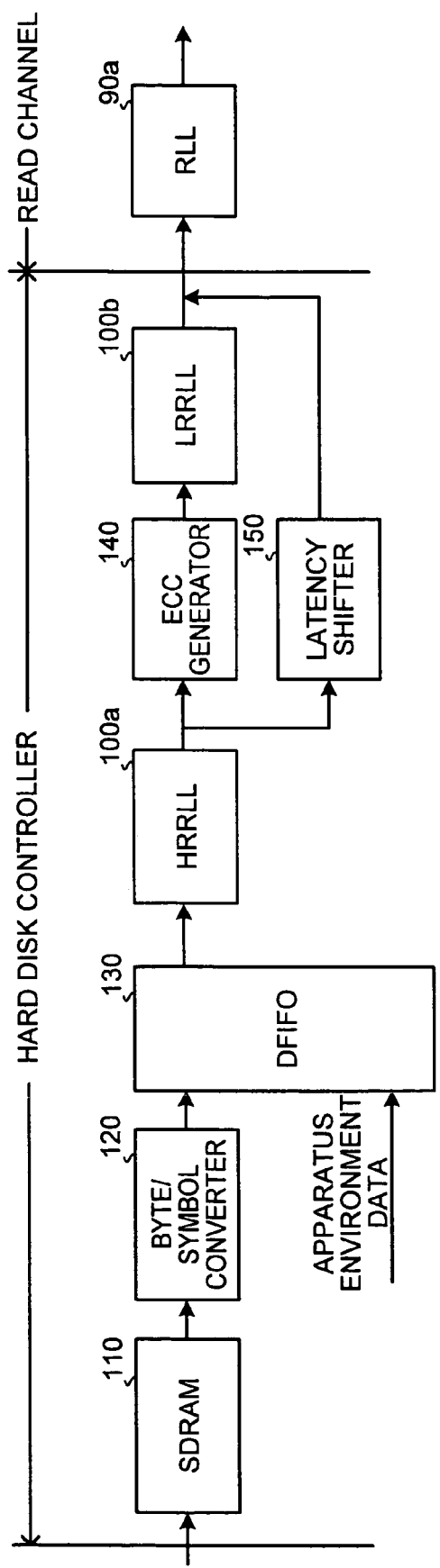
FIG. 3 is a diagram to explain another example of data processing executed by the hard disk controller.

Data processing executed by the hard disk controller 100 is not restricted to that shown in FIG. 2. FIG. 3 is a diagram to explain another example of data processing executed by the hard disk controller 100. As shown in FIG. 3, the hard disk controller 100 includes an HRRLL 100*a* and an LRRLL 100*b*, in addition to the configuration shown in FIG. 2. Because the other units are the same as those in FIG. 2, like reference numerals are designated with like parts, and are not explained further.

The HRRLL 100*a* executes a 416/414 conversion (414× 416÷414=416) of the symbol data received from the DFIFO 130, and passes the 416 symbols of data to the ECC generator 140 and the latency shifter 150. The HRRLL 100a includes a scrambler that randomizes the order of the symbol data.

The LRRLL 100b executes a 31/30 conversion (32×31÷30=33.1) of the 32 symbols of ECC data passed from the ECC generator 140, appends dummy data of 0.9, and passes 34 symbols of ECC data to the RLL 90a.

The RLL 90a shown in FIG. 3 executes a 60/61 conversion of the received data. If the HRRLL 100a has a scrambler, the RLL 90a does not have one, or inactivates its scrambler function.

Overall data processing by the hard disk controller 100 shown in FIG. 3 will be explained next. Host data from the host is temporarily stored in the SDRAM 110, and then passed to the byte/symbol converter 120, where units of the host data are converted from bytes to symbols. The converted data is passed to the DFIFO 130.

The DFIFO 130 appends apparatus environment data to the symbol data, and passes the data to the HRRLL 100a. The HRRLL 100a executes a 416/414 conversion of the data obtained from the DFIFO 130, and passes 416 symbols of data to the ECC generator 140 and the latency shifter 150.

The ECC generator 140 generates an ECC based on the data obtained from the HRRLL 100a, and passes the generated ECC to the RLL 90a. The latency shifter 150 delays the data obtained from the HRRLL 100a, and passes the data to the RLL 90a.

Figure 4:
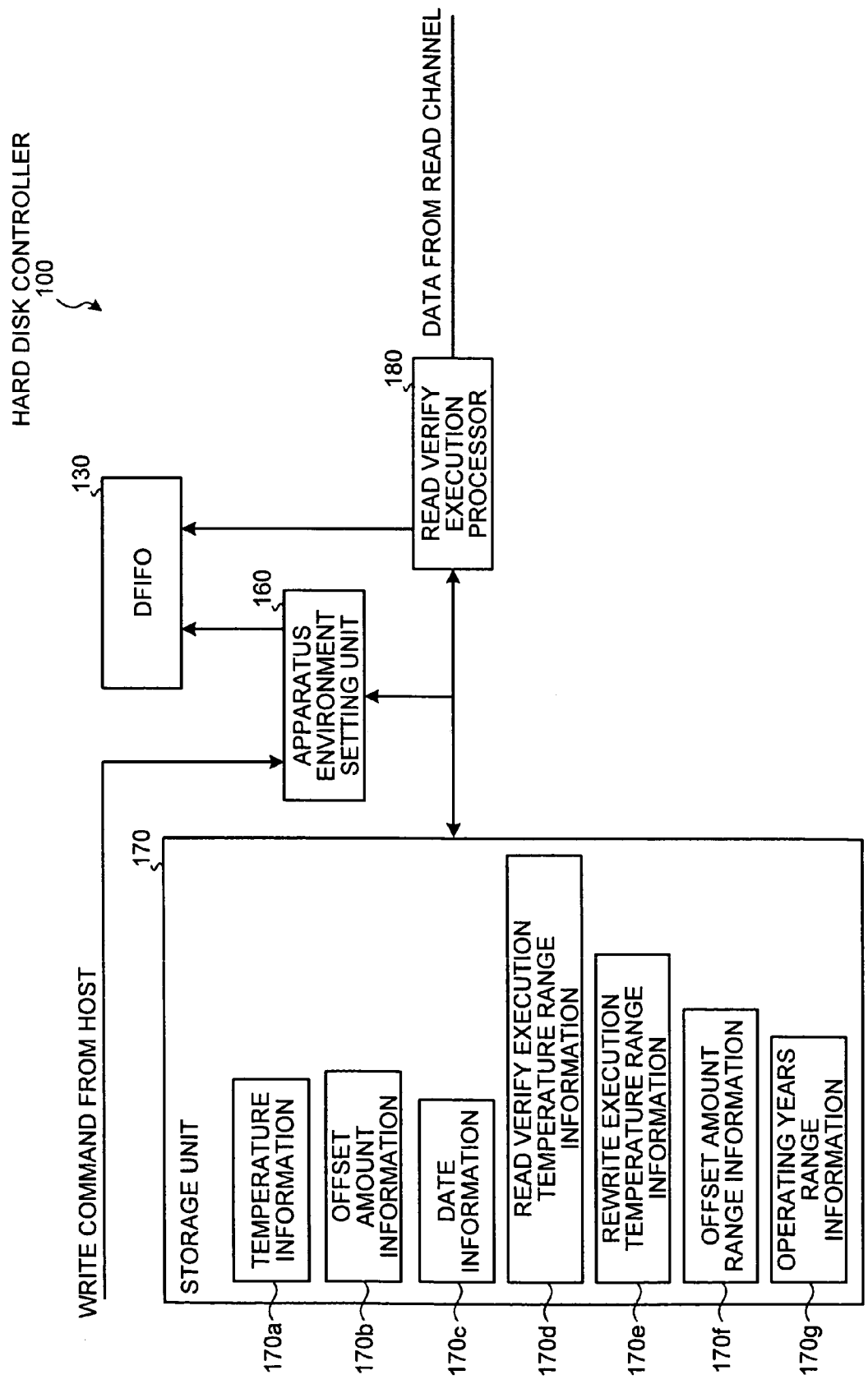
FIG. 4 is a functional block diagram of the hard disk controller.

Next, the configuration of the hard disk controller 100 shown in FIG. 1 will be explained with reference to a functional block diagram shown in FIG. 4. The hard disk controller 100 includes the DFIFO 130, an apparatus environment data setting unit 160, a storage unit 170, and a read verify execution processor 180.

The DFIFO 130 is the same as that in FIG. 2, and will not be explained further. The DFIFO 130 is connected to the byte/symbol converter 120, the ECC generator 140, and the latency shifter 150, shown in FIG. 2 (these are not shown in FIG. 4).

When a write command is received from a host, the apparatus environment data setting unit 160 creates apparatus environment data based on data stored in the storage unit 170, and appends the apparatus environment data to the symbol data that is momentarily stored by the DFIFO 130.

Figure 5:
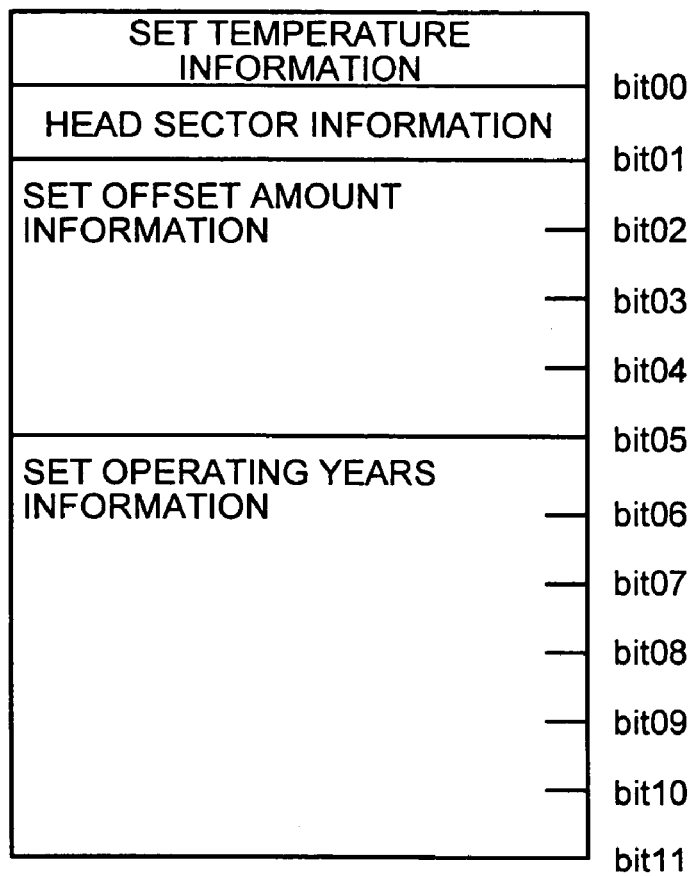
FIG. 5 is an example of a data structure of apparatus environment data.

FIG. 5 is an example of the data structure of the apparatus environment data. As shown in FIG. 5, the apparatus environment data includes set temperature information expressed in one bit, head sector information expressed in one bit, set offset amount information expressed in four bits, and set operating years information expressed in six bits.

The set temperature information is set based on temperature information 170a stored in the storage unit 170, and indicates whether the temperature in the disk enclosure 30 is lower than a predetermined temperature. The apparatus environment data setting unit 160 sets the bit that expresses the set temperature information to 1, if the temperature in the disk enclosure 30 is lower than the predetermined temperature.

The head sector information indicates whether the corresponding symbol data, among the continuous data, is written in a head sector of the magnetic disk 250. If the head sector information indicates that the symbol data is written to a head sector, and if a write command is received from the host, the apparatus environment data setting unit 160 sets the bit that expresses the head sector information to 1.

The set offset amount information represents, in sixteen stages, the degree of deviation (offset amount) between the position of the head and the track center. The apparatus environment data setting unit 160 determines a numerical value of the set offset amount information, based on offset amount information 170b stored in the storage unit 170. For example, when there is no deviation between the position of the head and the track center, the set offset information is zero, whereas when the deviation between the position of the head and the track center is at its maximum, the set offset information is 15.

The set operating years information indicates the number of years from the delivery of the magnetic disk apparatus 10 from the factory until the present time. The apparatus environment data setting unit 160 sets the operating years information based on date information 170c stored in the storage unit 170. Date information that is recorded in "seconds" is changed to "years" when setting.

Figure 6:
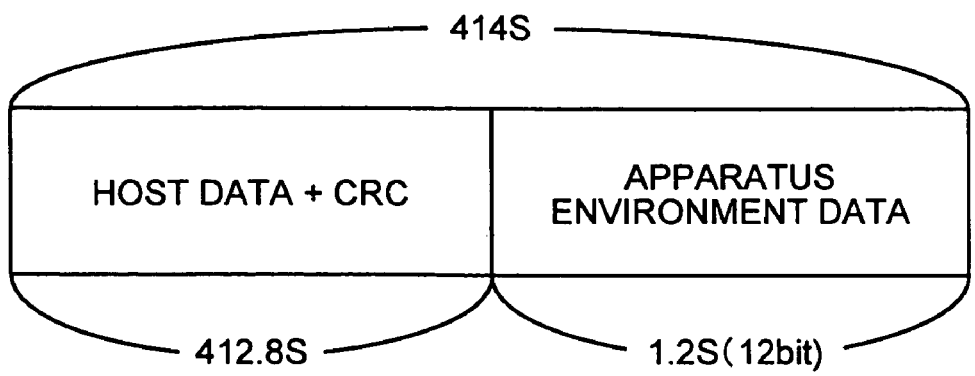
FIG. 6 is an example of a data structure of symbol data when an apparatus environment data setting unit appends the apparatus environment data to the symbol data.

FIG. 6 is an example of the data structure of symbol data when the apparatus environment data setting unit 160 appends apparatus environment data to the symbol data. As shown in FIG. 6, the 414 symbols of symbol data include 412.8 symbols of host data and CRC, and, 1.2 symbols (12 bits) of the apparatus environment data.

In the conventional storage resources such as a magnetic disk, a data region, is wasted by using it for dummy data, but in the present invention, that data region is used for the apparatus environment data. Thus, the storage space can be used effectively.

Returning to FIG. 4, the storage unit 170 stores data used by the apparatus environment data setting unit 160 for creating apparatus environment data, and data used by the read verify execution processor 180. The storage unit 170 includes the temperature information 170a, the offset amount information 170b, the date information 170c, read verify execution temperature range information 170d, rewrite execution temperature range information 170e, offset amount range information 170f, and operating years range information 170g.

The temperature information 170a indicates the temperature inside the disk enclosure 30. The offset amount information 170b indicates the degree of deviation between the position of the head and the track center. The date information 170c indicates the number of years from the delivery of the magnetic disk apparatus 10 from the factory until the present time.

The read verify execution temperature range information 170d indicates a temperature range that is appropriate for executing a read verify. The rewrite execution temperature range information 170e indicates the temperature range that is appropriate for executing a rewrite operation. The offset amount range information 170f indicates the range of offset amount within which rewrites is to be executed. The operating years range information 170g indicates the range of operating years within which rewrites is to be executed.

The read verify execution processor 180 periodically reads data stored in the magnetic disk 250, and determines whether to execute a rewrite based on the apparatus environment data contained in the data that is read form the magnetic disk 250, and the information stored in the storage unit 170.

Specifically, the read verify execution processor 180 determines that a rewrite must be executed, when the temperature inside the disk enclosure 30 at a point where data is written, is lower than a predetermined value, when the written data is in the head sector, when the offset amount of the written data exceeds a predetermined value, and when the operating years of the magnetic disk apparatus 10 exceed a predetermined value.

Upon determining that a rewrite must be executed, the read verify execution processor 180 passes the data read from the magnetic disk 250 to the DFIFO 130 for rewriting. The read verify execution processor 180 regularly updates the temperature information 170a and the offset amount information 170b in the storage unit 170.

Figure 7:
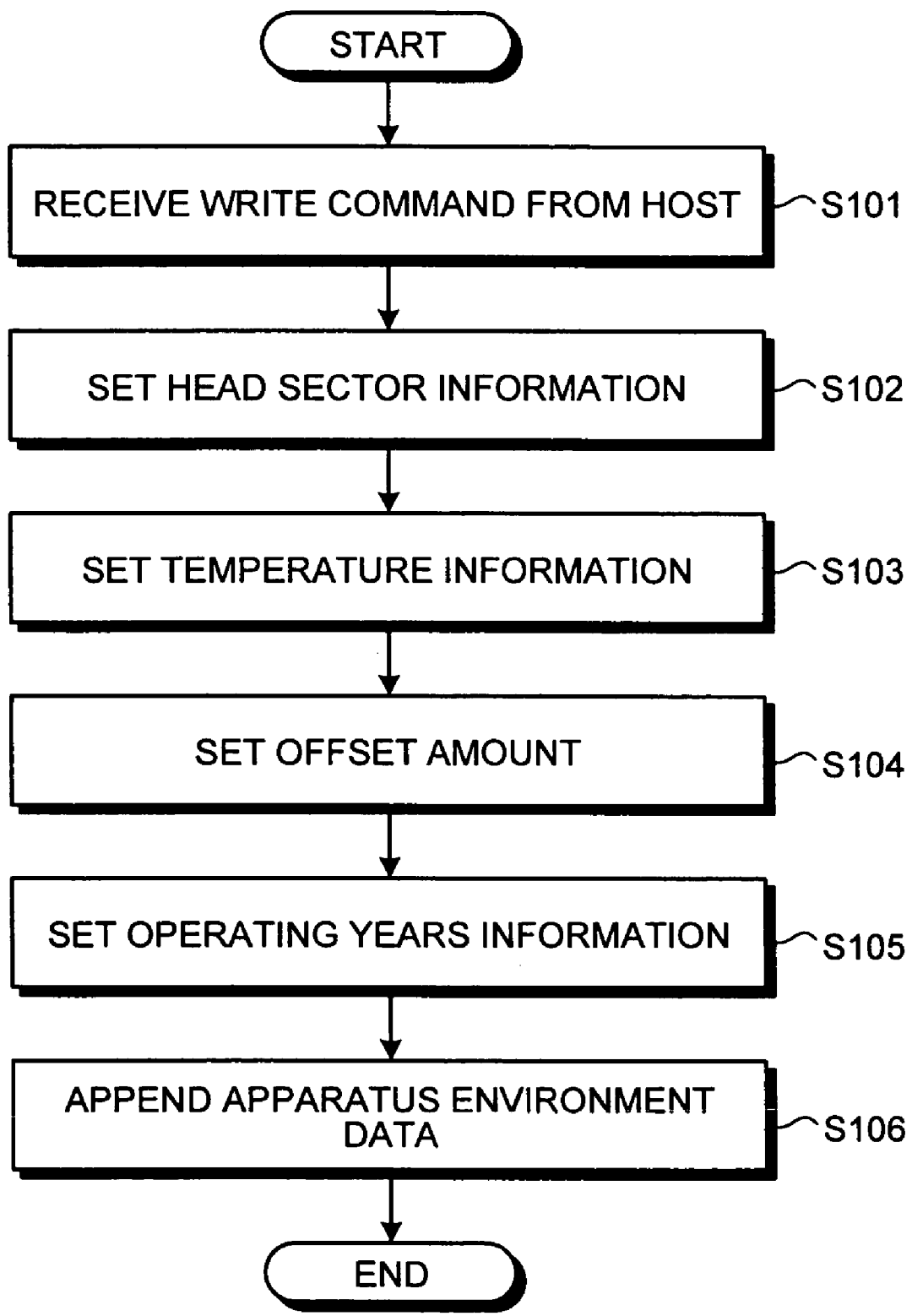
FIG. 7 is a flowchart of a process procedure executed by the apparatus environment data setting unit.

Process procedures executed by the apparatus environment data setting unit 160 will be explained next, with reference to a flowchart in FIG. 7. As shown in FIG. 7, the apparatus environment data setting unit 160 receives a write command from the host (step S101), and sets the head sector information (step S102).

The head sector information setting will be explained in detail. Upon receiving a write command from the host, and information indicating that the data is written to a head sector, the apparatus environment data setting unit 160 stores 1 as the head sector information of the apparatus environment data. On the other hand, upon receiving a write command from the host and information indicating that the data is not in a head sector, the apparatus environment data setting unit 160 stores 0 as the head sector information.

The apparatus environment data setting unit 160 then sets the temperature information (step S103). More specifically, the apparatus environment data setting unit 160 reads the temperature information 170a and the read verify execution temperature range information 170d from the storage unit 170. If the temperature in the temperature information 170a is not within the read verify execution temperature range, the apparatus environment data setting unit 160 stores 1 in the set temperature information of the apparatus environment data. If the temperature in the temperature information 170a is within the read verify execution temperature range, the apparatus environment data setting unit 160 sets 0 in the set temperature information.

The apparatus environment data setting unit 160 then sets the offset amount (step S104). More specifically, the apparatus environment data setting unit 160 reads the offset amount information 170b from the storage unit 170, identifies the offset amount based on the offset amount information 170b, and stores the identified offset amount in the set offset amount information of the apparatus environment data.

Next, the apparatus environment data setting unit 160 sets the operating years information (step S105). More specifically, the apparatus environment data setting unit 160 reads the date information 170c from the storage unit 170, identifies the number of years from the delivery of the magnetic disk apparatus 10 from the factory to the present time based on the date information 170c, and stores the identified number of years in the set operating years information of the apparatus environment data. The apparatus environment data setting unit 160 appends to the symbol data, the apparatus environment data, which is the set temperature information, the head sector information, the set offset amount information, and the set operating years information (step S106).

Because the apparatus environment data setting unit 160 creates the apparatus environment data based on the temperature and the like of the magnetic disk apparatus 10, and inputs the created apparatus environment data instead of dummy data, wasteful data regions can be used effectively.

A sequence of process procedure performed by the read verify execution processor 180, to determine whether to execute a rewrite based on the set temperature information, will be explained next, with reference to a flowchart in FIG. 8.

Figure 8:
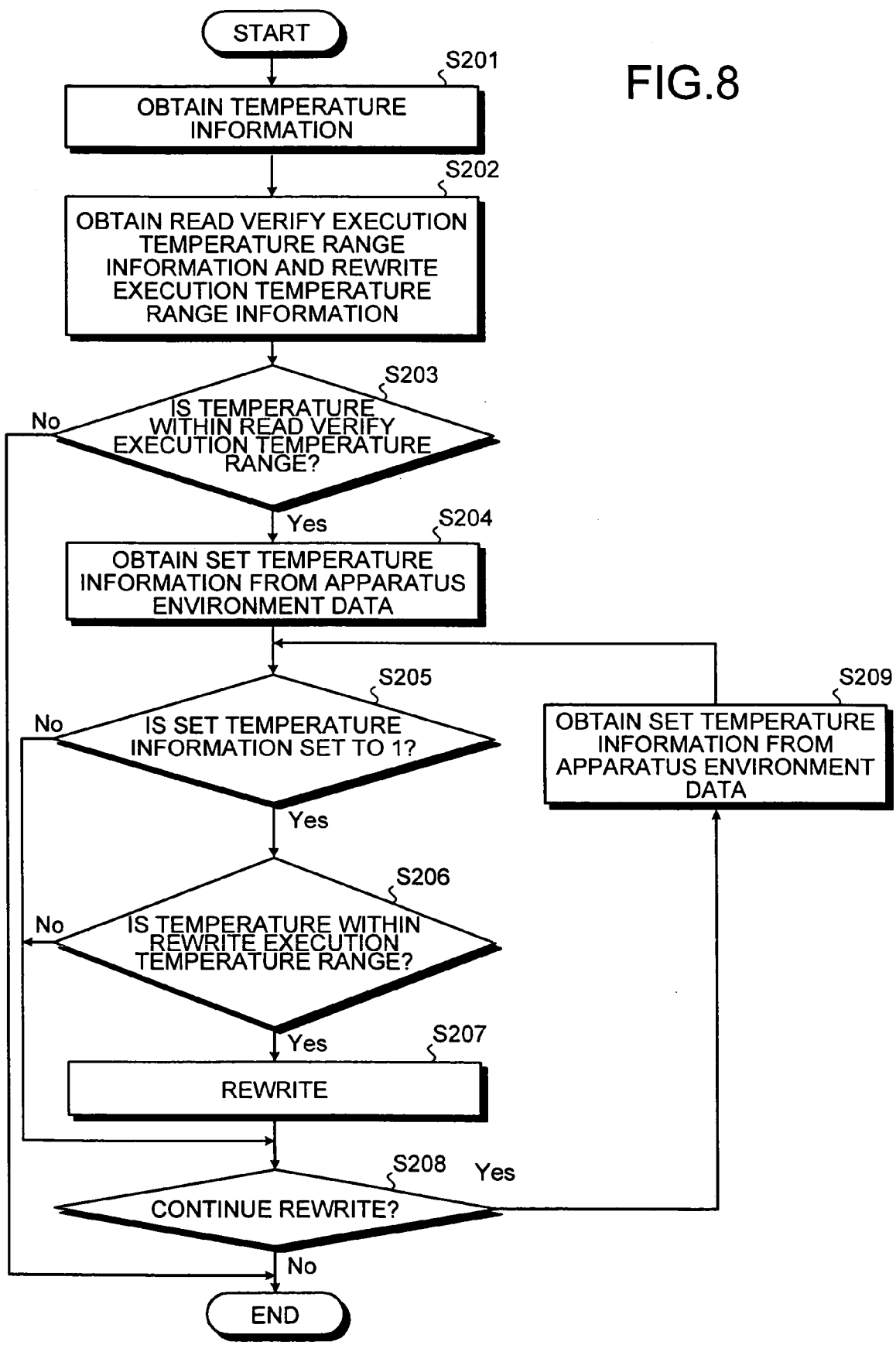
FIG. 8 is a flowchart of a process procedure executed by a read verify execution processor to determine whether to execute a rewrite, based on set temperature information.

As shown in FIG. 8, the read verify execution processor 180 extracts the temperature information 170a (step S201), the read verify execution temperature range information 170d, and the rewrite execution temperature range information 170e (step S202), and determines whether the temperature in the disk enclosure 30 is within the read verify execution temperature range (step S203).

If the temperature in the disk enclosure 30 is not within the read verify execution temperature range (No at step S203), processing ends. If the temperature in the disk enclosure 30 is within the read verify execution temperature range (Yes at step S203), the read verify execution processor 180 extracts the set temperature information from the apparatus environment data (step S204).

If the set temperature information is set to 1 (Yes at step S205), the read verify execution processor 180 determines whether the temperature in the disk enclosure 30 is within the rewrite execution temperature range (step S206). If the temperature in the disk enclosure 30 is within the rewrite execution temperature range (Yes at step S206), the read verify execution processor 180 executes a rewrite (step S207).

If the set temperature information is set to 0 (No at step S205), processing shifts to step S208. If the temperature in the disk enclosure 30 is outside the rewrite execution temperature range (No at step S206), processing shifts to step S208.

After executing rewrite processing, the read verify execution processor 180 determines whether to continue rewriting (step S208). If rewrite is to be continued (Yes at step S208), the read verify execution processor 180 obtains set temperature information from the next apparatus environment data (step S209), and shifts to step S205. If rewrite is to not be continued (No at step S208), the process ends.

Because the read verify execution processor 180 executes a rewrite when the set temperature information of the apparatus environment data is 1, it is possible to efficiently rewrite data that is written at low temperature and that cannot easily be read normally.

A process procedure executed by the read verify execution processor 180 to determine whether to execute a rewrite based on the set offset amount information will be explained next, with reference to a flowchart in FIG. 9.

Figure 9:
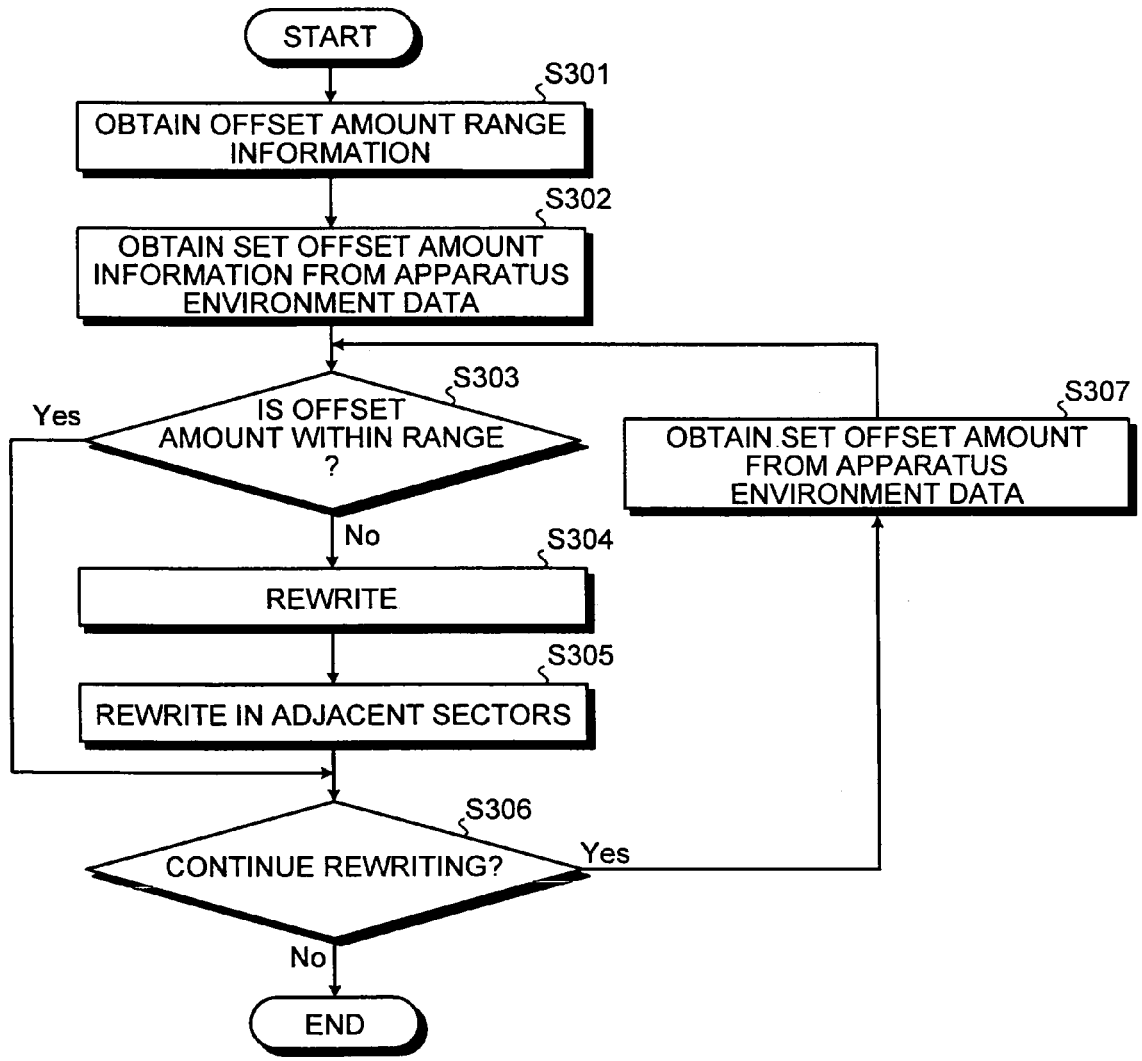
FIG. 9 is a flowchart of a process procedure executed by the read verify execution processor to determine whether to execute the rewrite, based on set offset amount information.

As shown in FIG. 9, the read verify execution processor 180 obtains the offset amount range information 170f (step S301) and the set offset amount information from the apparatus environment data (step S302).

If the offset amount indicated by the set offset amount information is outside a permitted offset amount range (No at step S303), the read verify execution processor 180 executes rewrite process (step S304), and also rewrites the data in sectors on both sides of the position where the data, which corresponds to the apparatus environment data, is written (step S305).

On the other hand, if the offset amount indicated by the set offset amount information is within the permitted offset amount range (Yes at step S303), processing shifts to step S306.

After executing the rewrite process, the read verify execution processor 180 determines whether to continue rewriting (step S306). If rewrite is to be continued (Yes at step S306), the read verify execution processor 180 obtains a set offset amount from the next apparatus environment data (step S307), and returns to step S303. If rewrite is to not be continued (No at step S306), the process ends.

Because the read verify execution processor 180 executes the rewrite process when the offset amount of data written to the magnetic disk 250 exceeds a predetermined value, it is possible to efficiently rewrite data that cannot easily be read normally.

A process procedure executed by the read verify execution processor 180, to determine whether to execute a rewrite based on the head sector information will be explained next with reference to a flowchart in FIG. 10.

Figure 10:
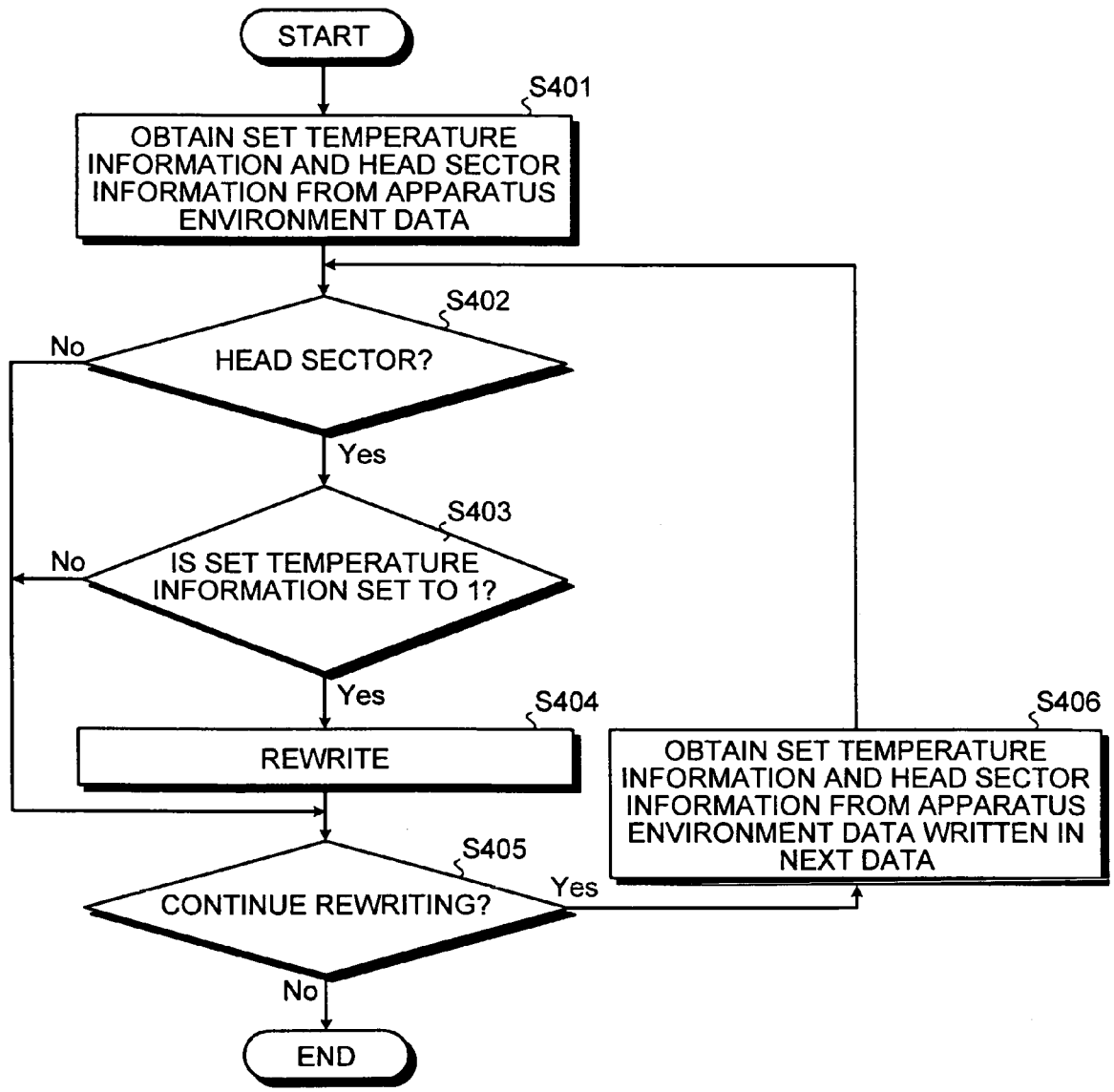
FIG. 10 is a flowchart of a process procedure executed by the read verify execution processor to determine whether to execute the rewrite, based on head sector information.

As shown in FIG. 10, the read verify execution processor 180 obtains the head sector information and the set temperature information from the apparatus environment data (step S401). If the data is written in a head sector (Yes at step S402), the read verify execution processor 180 determines whether the set temperature information is set to 1 (step S403), and if so (Yes at step S403), executes rewrite process (step S404)

When the data is not written in a head sector (No at step S402) and/or the set temperature information is not set to 1, the process shifts to step S405.

After executing the rewrite process, the read verify execution processor 180 determines whether to continue rewriting (step S405). If the rewrite is to be continued (Yes at step S405), the read verify execution processor 180 obtains head sector information and set temperature information from the apparatus environment data written in the next data (step S406), and returns to step S402. If the rewrite is to not be continued (No at step S405), the process ends.

Because the read verify execution processor 180 executes a rewrite if the data written in the magnetic disk 250 is in a head sector and its set temperature information is set to 1, it is possible to efficiently rewrite data that cannot easily be read normally.

The read verify execution processor 180 may compare the temperature at the time when the data is written to the magnetic disk 250 with the temperature at the time of rewriting, and execute rewriting when the latter temperature is higher.

A process procedure executed by the read verify execution processor 180, to determine whether to rewrite based on the set operating years information will next be explained next with reference to a flowchart in FIG. 11.

Figure 11:
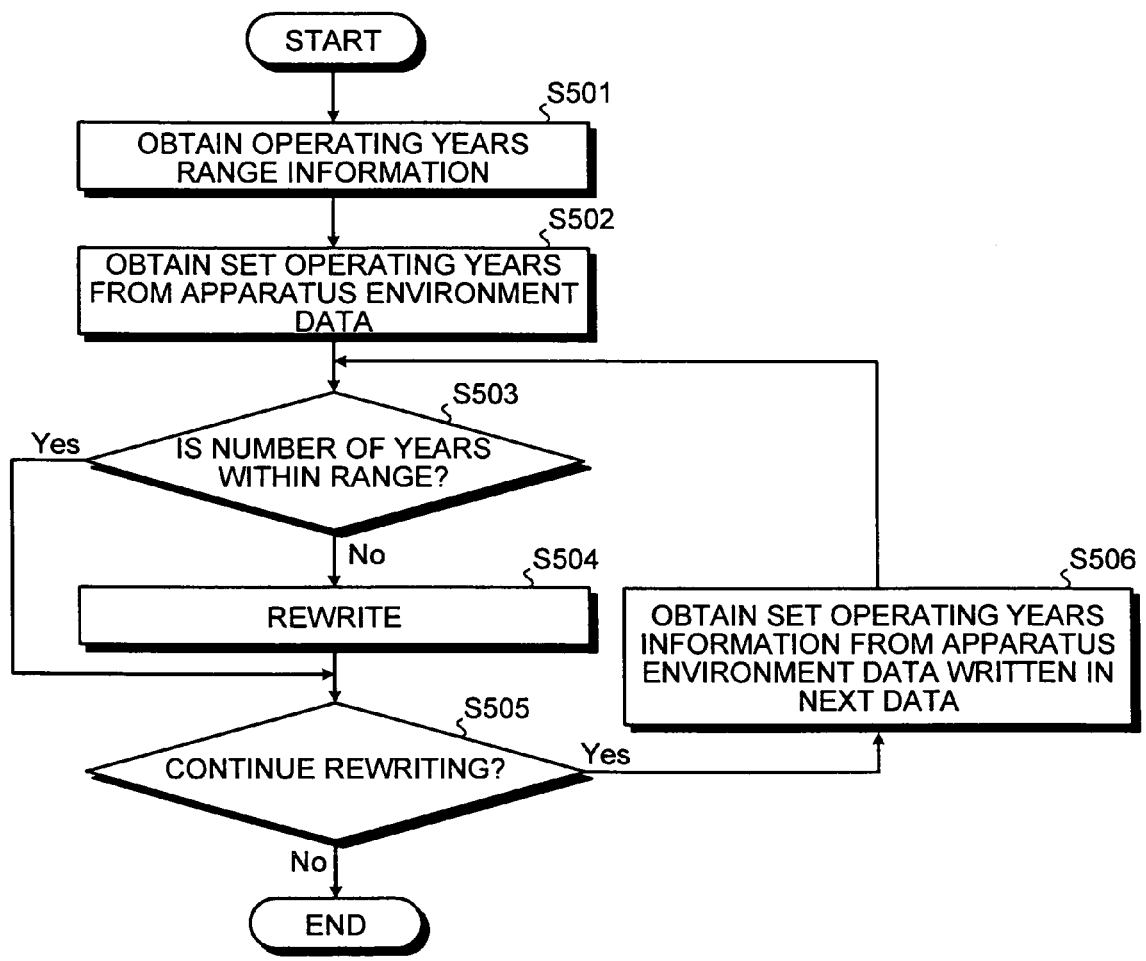
FIG. 11 is a flowchart of a process procedure executed by the read verify execution processor to determine whether to execute the rewrite, based on set operating years information.

As shown in FIG. 11, the read verify execution processor 180 obtains the operating years range information 170g (step S501) and the set operating years information in the apparatus environment data (step S502).

The read verify execution processor 180 then determines whether the number of operating years is within a permitted operating years range (step S503), and if not (No at step S503), executes rewriting (step S504). If rewrite is to be continued (Yes at step S505), the read verify execution processor 180 obtains the set operating years information from the apparatus environment data written in the next data (step S506), and returns to step S503. If rewrite is to not be continued (No at step S505), the process ends. If the number of operating years is within the permitted range, the process shifts to step S505.

Because the read verify execution processor 180 executes a rewrite if the number of operating years of the magnetic disk apparatus 10 is outside the permitted range, it becomes possible to efficiently rewrite data that cannot easily be read normally.

As described above, in the hard disk controller 100 according to this embodiment, the apparatus environment data setting unit 160 creates apparatus environment data, and appends the apparatus environment data to the symbol data. When a read verify is performed, the read verify execution processor 180 determines whether to rewrite, based on the apparatus environment data contained in the data read from the magnetic disk 250. Thus, the data that cannot be easily read normally can be rewritten efficiently.

According to an aspect of the present invention, the data can be efficiently rewritten.

Moreover, data that needs to be rewritten on a priority basis can be promptly rewritten.

Furthermore, limited data resources can be used effectively.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A disk controlling apparatus that controls a disk apparatus, comprising:
   a storage disk into which the disk apparatus writes and rewrites data and from which the disk apparatus reads data;
   an environment information creating unit that creates environment information that includes at least information relating to a temperature inside the disk apparatus as one type of information relating to an environment of the disk apparatus, wherein the temperature is detected when the data is written;
   a storing unit that inputs the environment information in a wasteful data region that is generated when a byte of data is converted to a symbol of data, in which dummy data is stored, as data to be written to the storage disk instead of the dummy data, wherein each environmental information inputted and each data that corresponds to each environmental information are written into the storage disk in a correlated form, and the wasteful data region and the data are included in a symbol data generated by converting units of the data from bytes to symbols; and
   a rewrite process determining unit that determines whether to execute a rewrite process for rewriting data in the storage disk based on the environment information that corresponds to the data read from the storage disk.

2. The disk controlling apparatus according to claim 1, wherein the environment information further includes
   information indicating whether the data is written to a head sector of the storage disk,
   information relating to an offset amount of the data to be written to the storage disk, and
   information indicating a number of operating years of the disk apparatus.

3. The disk controlling apparatus according to claim 2, wherein
   the rewrite processing determining unit determines that the rewrite process is to be executed when the temperature inside the disk apparatus is less than a predetermined value.

4. The disk controlling apparatus according to claim 2, wherein
   the rewrite process determining unit determines that the rewrite process is to be executed when the data is written to the head sector of the storage disk.

5. The disk controlling apparatus according to claim 2, wherein
   the rewrite process determining unit determines that the rewrite process is to be executed when the offset amount of the data written to the storage disk exceeds a predetermined value.

6. The disk controlling apparatus according to claim 2, wherein
   the rewrite process determining unit determines that the rewrite process is to be executed when the number of the operating years of the disk apparatus exceeds a predetermined value.

7. The disk controlling apparatus according to claim 1, further comprising:
   a unit converting unit that converts units of the data from bytes to symbols, wherein the storage unit appends the environment information in the wasteful data region.

8. A computer-readable recording medium, that records therein a computer program for controlling a disk apparatus that writes and rewrites data into a storage disk and reads data from the storage disk, the computer program including instructions which, when executed, cause a computer to execute:

creating environment information that includes at least information relating to a temperature inside the disk apparatus as one type of information relating to an environment of the disk apparatus, wherein the temperature is detected when the data is written;

inputting the environment information in a wasteful data region that is generated when a byte of data is converted to a symbol of data, in which dummy data is stored, as data to be written to the storage disk instead of the dummy data, wherein each environmental information inputted and each data that corresponds to each environmental information are written into the storage disk in a correlated form, and the wasteful data region and the data are included in a symbol data generated by converting units of the data from bytes to symbols; and determining whether to execute a rewrite process based on the environment information that corresponds to the data read from the storage disk.

9. The recording medium according to claim 8, wherein the environment information further includes information indicating whether the data is written to a head sector of the storage disk, information relating to an offset amount of the data to be written to the storage disk, and information indicating a number of operating years of the disk apparatus.

10. The recording medium according to claim 9, wherein the determining includes determining that the rewrite process is to be executed, if the temperature in the disk apparatus is less than a predetermined value.

11. The recording medium according to claim 9, wherein the determining includes determining that the rewrite process is to be executed, if the data is written to the head sector of the storage disk.

12. The recording medium according to claim 9, wherein the determining includes determining that the rewrite process is to be executed, if the offset amount of the data written to the storage disk exceeds a predetermined value.

13. The recording medium according to claim 9, wherein the determining includes determining that the rewrite process is to be executed, if the number of the operating years of the disk apparatus exceeds a predetermined value.

14. The recording medium according to claim 8, further comprising:

converting units of the data from bytes to symbols, wherein the inputting includes storing the environment information in the wasteful data region.

15. A method of controlling a disk apparatus that writes and rewrites data into a storage disk and reads data from the storage disk, comprising:

creating environment information that includes at least information relating to a temperature inside the disk apparatus as one type of information relating to an environment of the disk apparatus, wherein the temperature is detected when the data is written;

inputting the environment information in a wasteful data region that is generated when a byte of data is converted to a symbol of data, in which dummy data is stored, as data to be written to the storage disk instead of the dummy data, wherein each environmental information inputted and each data that corresponds to each environmental information are written into the storage disk in a correlated form, and the wasteful data region and the data are included in a symbol data generated by converting units of the data from bytes to symbols; and determining whether to execute a rewrite process based on the environment information that corresponds to the data read from the storage disk.

* * * * *